(12) United States Patent
Rau et al.

(10) Patent No.: US 7,216,759 B2
(45) Date of Patent: May 15, 2007

(54) CONVEYOR BELT MODULES WITH EMBEDDED SPHERICAL ROLLERS RETAINED IN THE MODULES

(75) Inventors: Brien G. Rau, Jefferson, LA (US); Richard J. Sofranec, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/161,705

(22) Filed: Aug. 12, 2005

(65) Prior Publication Data

US 2005/0269189 A1   Dec. 8, 2005

Related U.S. Application Data

(62) Division of application No. 10/707,888, filed on Jan. 21, 2004, now Pat. No. 6,997,306.

(51) Int. Cl.
   *B65G 17/06*   (2006.01)
   *B65G 17/38*   (2006.01)
   *B65G 17/00*   (2006.01)
   *B65G 17/24*   (2006.01)

(52) U.S. Cl. .................. 198/853; 198/779; 198/850; 198/851; 198/852

(58) Field of Classification Search ............... 198/853, 198/779, 386, 371.3, 845, 851, 852, 850
   See application file for complete search history.

(56) References Cited

U.S. PATENT DOCUMENTS

| | | | |
|---|---|---|---|
| 3,550,756 A | 12/1970 | Kornylak | 198/183 |
| 4,231,469 A | 11/1980 | Arscott | 198/779 |
| 4,733,768 A | 3/1988 | Aquino et al. | 198/369 |
| 4,880,107 A | 11/1989 | Deal | 198/779 |
| 5,096,050 A | 3/1992 | Hodlewsky | 198/779 |
| 5,224,583 A | 7/1993 | Palmaer et al. | 198/779 |
| 5,238,099 A * | 8/1993 | Schroeder et al. | 198/456 |
| 5,261,525 A | 11/1993 | Garbagnati | 198/779 |
| 5,404,997 A | 4/1995 | Schrier et al. | 198/779 |
| 6,073,747 A * | 6/2000 | Takino et al. | 198/370.09 |
| 6,209,714 B1 * | 4/2001 | Lapeyre et al. | 198/779 |
| 6,318,544 B1 * | 11/2001 | O'Connor et al. | 198/853 |
| 6,364,095 B1 | 4/2002 | Layne et al. | 198/852 |
| 6,401,914 B1 | 6/2002 | Greve | 198/852 |
| 6,494,312 B2 * | 12/2002 | Costanzo | 198/779 |
| 6,681,922 B2 | 1/2004 | Corley et al. | 198/853 |
| 6,758,323 B2 | 7/2004 | Costanzo | 198/457.02 |
| 6,874,617 B1 * | 4/2005 | Layne | 198/779 |
| 7,021,454 B2 * | 4/2006 | Ozaki et al. | 198/779 |
| 2004/0173441 A1 * | 9/2004 | Wieting et al. | 198/850 |

* cited by examiner

Primary Examiner—Gene O. Crawford
Assistant Examiner—Ramya G. Prakasam
(74) Attorney, Agent, or Firm—James T. Cronvich (57) ABSTRACT

A plastic conveyor belt module with embedded spherical rollers retained in the module and a belt constructed of such modules. The module includes a module body forming a cavity, a spherical roller in the cavity, and a retainer retained in the cavity to hold the spherical roller rotatably in place. A salient portion of the roller extends outward from the cavity through the retainer past an outer surface of the module. The retainer is attached to the module body by ultrasonic welding, epoxy- or solvent-bonding, spin welding, electromagnetic welding, staking, screwing, or locking.

20 Claims, 7 Drawing Sheets

CONVEYOR BELT MODULES WITH EMBEDDED SPHERICAL ROLLERS RETAINED IN THE MODULES

CROSS-REFERENCE TO RELATED APPLICATIONS

This application is a division of our application Ser. No. 10/707,888, entitled "Conveyor Belt Modules with Embedded Rollers Retained in the Modules and Associated Method," filed Jan. 21, 2004 now U.S. Pat. No. 6,997,306, and incorporated herein by reference.

BACKGROUND

This invention relates to power-driven conveyors generally and, more specifically, to modular plastic conveyor belts with embedded spherical rollers.

Modular plastic conveyor belts are widely used to convey a variety of articles. Rollers are often installed in the belts for product accumulation, singulation, sortation, indexing, or side off-transfer. Rollers are also used to lower the friction between belts and conveyor supporting wearstrips or side rails. One way rollers are integrated into conveyor belts is by mounting them for rotation on a hinge rod interconnecting successive rows of belt modules. Another way is snapping roller assemblies onto belt modules. Yet another way is molding rollers into belt modules when the modules are being formed. But each of these methods has its shortcomings.

For example, mounting rollers on hinge rods typically requires that hinge eyes be removed first to make room for the rollers. Because belt tension is borne by the hinge eyes, removing a few decreases the pull strength of the belt. As another example, snap-in roller assemblies can break. If the snap-in retention structure is broken, the broken pieces or the assembly itself can disengage from the belt and contaminate product or cause other damage. As a final example, molding rollers into a module as part of the injection-molding process requires special provisions in the mold and manual intervention and hand placement of rollers in each mold cycle. This makes for an expensive mold and decreases the duty cycle of the mold machine. Furthermore, once molded in, a roller with an axle is permanently fixed in orientation.

SUMMARY

These shortcomings are overcome by a conveyor belt module with embedded spherical rollers. A first version of a belt module embodying features of the invention includes a module body that extends in thickness from a first side to a second side and forms a cavity opening onto at least one of the first and second sides. A spherical roller is disposed in the cavity. A retainer ring retained in the cavity covers a portion of the spherical roller to retain the roller rotatably in the cavity with a salient portion of the roller extending outward of at least one of the first and second sides of the module body.

According to another aspect of the invention, a plastic conveyor belt module comprises a module body that extends in thickness from a first outer surface to a second outer surface. Interior wall structure defines a cavity in the module body. The wall structure includes a first closed wall that extends from an inner edge to a outer edge terminating at the first outer surface of the module body. The first closed wall has a first diameter. A second closed wall coaxial with the first closed wall extends from an inner edge to an outer edge terminating at the second outer surface. The second closed wall has a second diameter less than the first diameter of the first closed wall. A ledge is disposed between the inner edge of the first closed wall and the inner edge of the second closed wall. A spherical roller is disposed in the cavity. A retainer dimensioned to be received in the cavity surrounded by the first closed wall retains the roller rotatably in the cavity with a salient portion of the roller extending through the retainer outward of the first outer surface.

BRIEF DESCRIPTION OF THE DRAWINGS

These and other features, aspects, and advantages of the invention are better understood by reference to the following description, appended claims, and accompanying drawings, in which:

DETAILED DESCRIPTION

Figure 1:
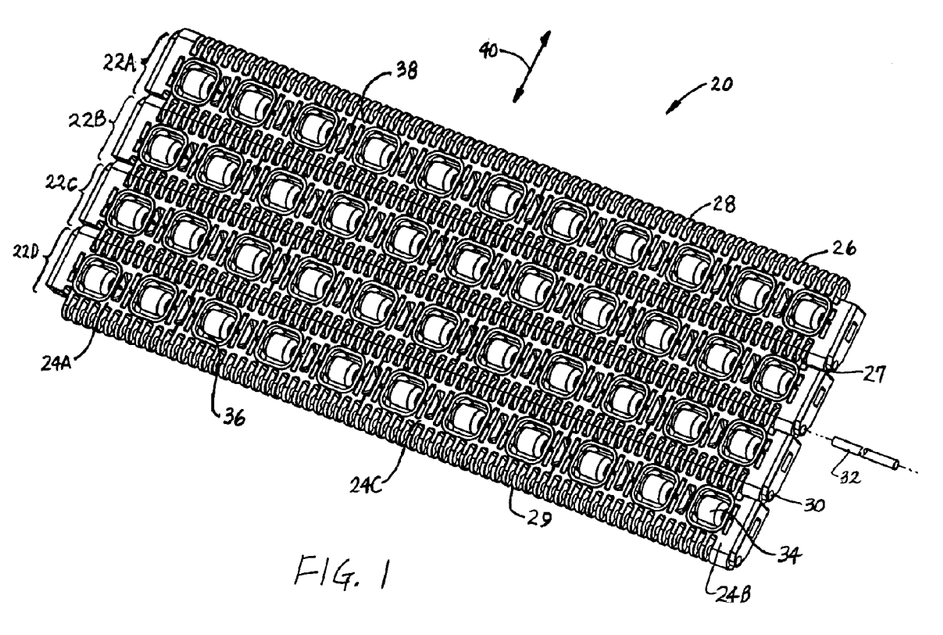
FIG. 1 is a pictorial view of a portion of a conveyor belt constructed of plastic belt modules embodying features of the invention.

A portion of a modular plastic conveyor belt having modules embodying features of the invention is shown in FIG. 1. The belt 20 is constructed of a series of rows 22A–D of belt modules 24: short edge modules 24A, long edge modules 24B, and interior modules 24C. Although the modules are preferably arranged in a bricklay, the belt could be formed otherwise, such as with a single module per row. Each module extends longitudinally from a first end 26 to a second end 27. A first set of hinge eyes 28 is arranged with the hinge eyes spaced apart along the first end, and a second set of hinge eyes 29 is arranged with the hinge eyes spaced apart along the second end. The first set of hinge eyes of one row of modules interleaves with the second set of hinge eyes of an adjacent row. Aligned apertures 30 in the interleaved hinge eyes form a transverse passageway across the width of the belt. A hinge rod 32 journaled in the passageway connects consecutive rows together in a hinge joint that allows the belt to articulate about drive and idler sprockets or returnway rollers. The modules of the belt are characterized by rollers 34 embedded in cavities 36 formed in the belt modules. The rollers extend outward of an outer surface 38 of the belt to engage conveyed articles in rolling contact (if the outer surface is a conveying surface) or to engage conveyor support surfaces in low-friction rolling contact (if the outer surface is the supported surface of the belt).

The rollers depicted in FIG. 1 are in-line rollers in which the axis of rotation of the rollers is transverse to the direction of belt travel 40. The belt could alternatively be constructed with rollers rotating about axes perpendicular or oblique to those in FIG. 1 or with freely rotatable roller balls.

Figure 2A:
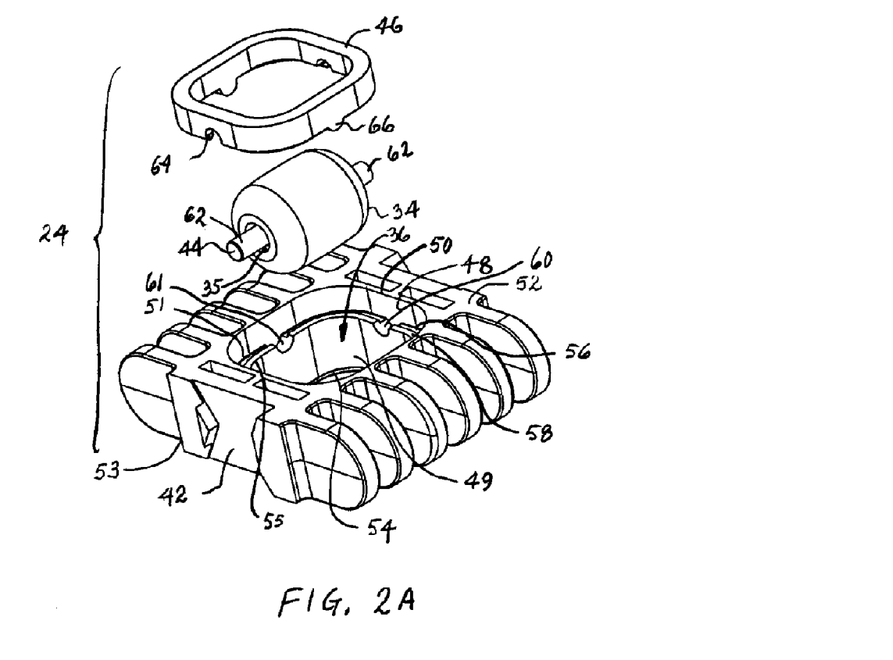
FIGS. 2A and 2B are exploded isometric views of a portion of one version of a module usable in the conveyor belt of FIG. 1 with a roller in an in-line orientation and in a transverse orientation.

A portion of a belt module 24 like those in FIG. 1 is shown in FIG. 2A. The module includes a module body 42, a cylindrical roller 34 mounted on an axle 44 through a bore 35 in the roller, and a retainer ring 46. The module body has internal wall structure in the form of a first closed wall 48—a generally four-sided rectangular shape with rounded corners. An outer edge 50 of the first wall terminates at a first outer surface 52 of the module. Coaxial with the first wall is a second closed wall 49 having a smaller interior diameter than that of the first wall. The internal wall structure defines a cavity 36 that opens onto the first 52 and an opposite second outer surface 53 of the module body. The two surfaces define the thickness of the module body. (The term "diameter" and its variants are used here to refer generally to the distance between two points on a closed wall measured through the centroid of the wall. In comparing the "diameters" of two walls, corresponding, geometrically similar points on each wall defining geometrically corresponding "diameters" must be compared.) An outer edge 54 of the second wall terminates at the second outer surface 53 of the module body. A ledge 56 with a lip 58 is formed in the internal wall structure between the inner edges 51, 55 of the two walls. Pairs of notches 60, 61 are formed in the ledge. Each notch shown is associated with a diametrically opposed notch in the opposite side of the wall, but not visible in FIG. 2A. The pair of notches 60 each receive an end 62 of the axle to support the roller in the cavity. The retainer ring includes a pair of diametrically opposed indentations 64 that are sized to cover the ends of the axle when the ring is inserted in the cavity. The ring also includes a pair of diametrically opposed protrusions 66 sized to fit in the notches in the ledge. In this case, the protrusions are received in the notches 61 not supporting the axle. Thus, the protrusions on the retainer ring and the notches in the ledge form keying structure that ensures proper alignment of the retainer ring and the roller in the cavity. With the retainer ring in place, the roller is retained in the cavity free to rotate about its axle, which is transverse to the longitudinal direction of the module for an in-line roller configuration.

Figure 2B:
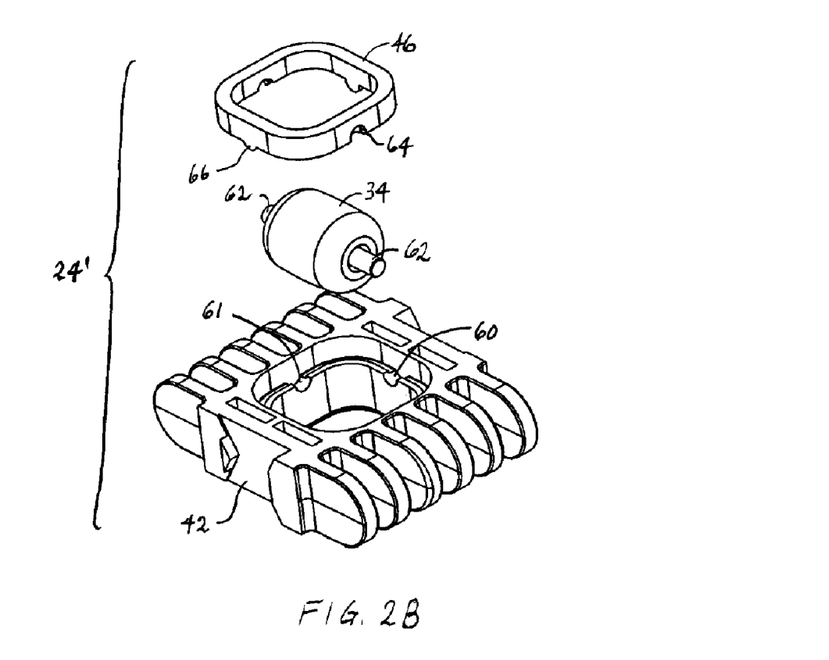

The same component shown in FIG. 2A can be arranged to construct a transverse roller belt module 24' as shown in FIG. 2B. In this example, the ends 62 of the axle are received in diametrically opposed notches 61, instead of notches 62. This effectively orients the axle longitudinally—perpendicular to the orientation in FIG. 2A. The retainer ring 46 is also rotated 90° so that its protrusions mate with keying notches 60, instead of notches 61, to form a transverse roller belt module. Thus, alternative axes of roller rotation are possible with this version of belt module.

Figure 3A:
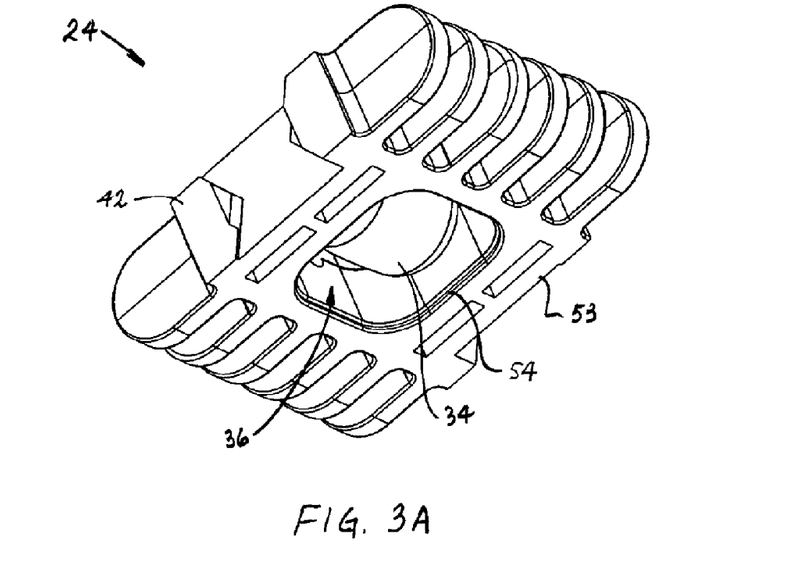
FIG. 3A is a bottom isometric view of the module of FIG. 2A.
Figure 3B:
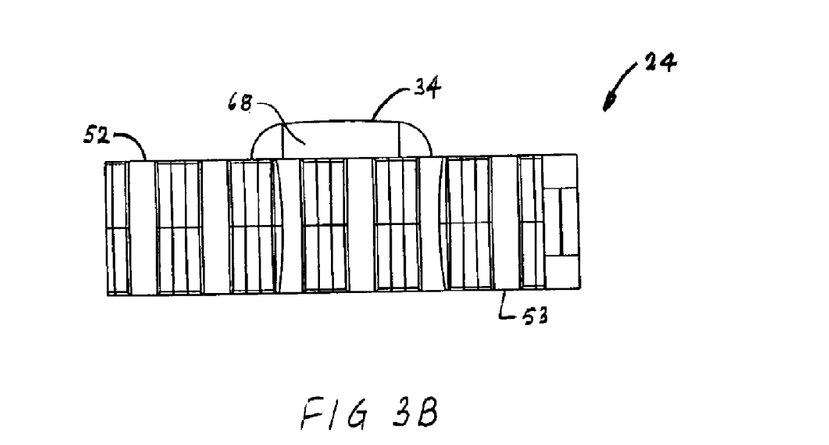
FIG. 3B is a front elevation view of the module of FIG. 2A.

The in-line roller module 24 is shown in more detail in FIGS. 3A and 3B. In this example, the cavity 36 opens onto the second outer side 53—in this case, the bottom—of the module body 42. But it would be possible to close the cavity opening because the roller 34 is recessed inward from the outer side 53. As shown in FIG. 3B, a salient portion 68 of the embedded roller 34 extends outward beyond the first outer side 52—in this case, the top, conveying side—to engage conveyed articles in rolling contact.

Figure 4:
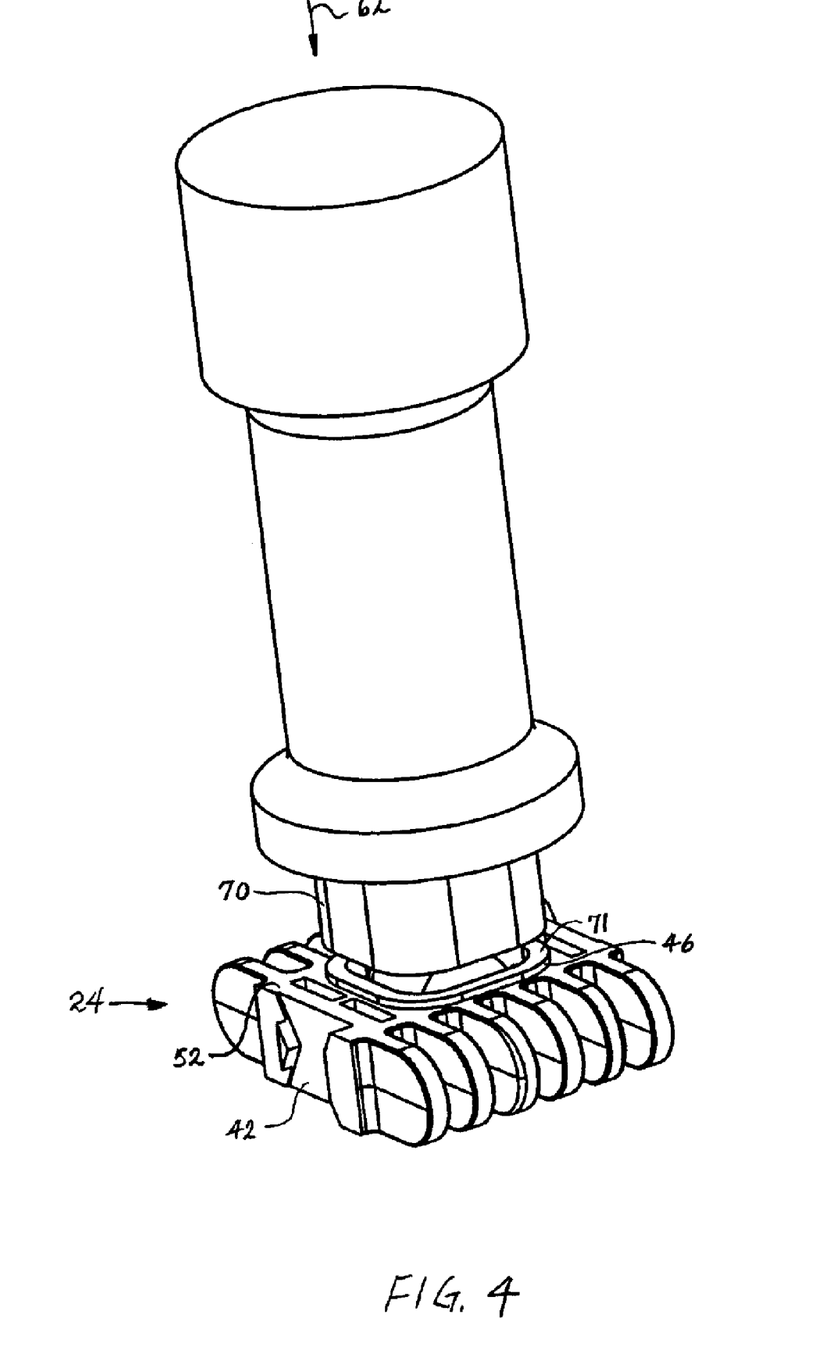
FIG. 4 is an isometric view of the module portion of FIG. 2B before the roller is welded into place in the module.

In the making of such a module, a module body is first molded out of a thermoplastic material, such as polyethylene, polypropylene, acetal, or composite polymers, preferably by injection molding. The molded module is characterized by an internal wall structure defining a cavity opening onto an outer side of the module. A roller is then positioned in the cavity. A retainer is then installed in the cavity to retain the roller rotatably in place. A preferred method of making these modules is shown in FIG. 4. Once the retainer is inserted into the cavity, it is welded ultrasonically to the ledge, or seat, on which the retainer ring sits. An ultrasonic horn 70 shaped to match the retainer ring 46 is put in contact with the ring. Ultrasonic energy rapidly vibrates the bottom of the ring against the seat and causes the seat and the bottom of the ring to melt by friction. A ridge formed along the bottom of the ring is allowed to melt to form the bond with the seat. Downward pressure 62 on the horn pushes the ring deeper toward the seat as the ridge on the bottom of the ring melts until the top surface 71 of the ring is preferably flush with the outer surface 52 of the module. An example ultrasonic horn for such an operation is made of titanium and provides an amplitude of 90–120 microns at 20 kHz. Branson Ultrasonics Corporation of Danbury, Conn., USA, is one manufacturer of this kind of device.

Figure 5:
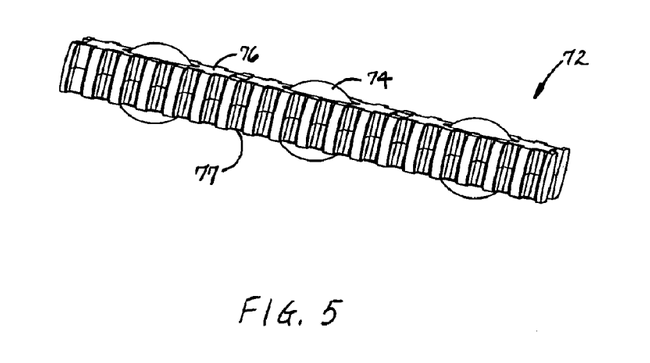
FIG. 5 is a pictorial view of a portion of another version of a conveyor belt module with spherical rollers usable in a conveyor as in FIG. 1.

Another version of embedded-roller module is shown in FIG. 5. This module 72 has spherical roller balls 74 that can rotate freely in all directions. The spherical rollers also extend beyond both the top and bottom outer surfaces 76, 77 of the module in this example. Such a module can be made in different ways.

Figure 6A:
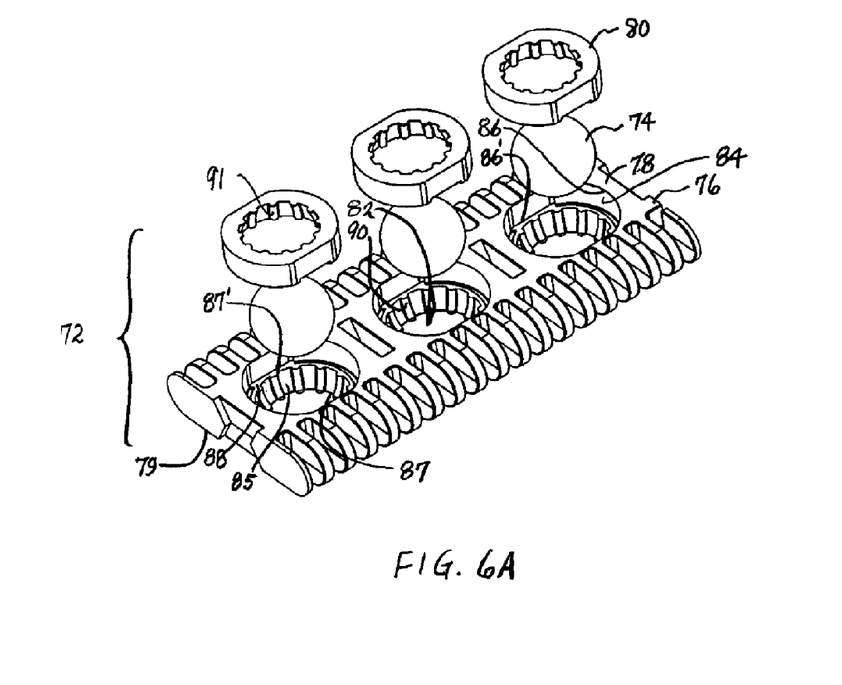
FIG. 6A is an exploded isometric view of a portion of a module as in FIG. 5 using a welded or bonded roller retainer.
Figure 6B:
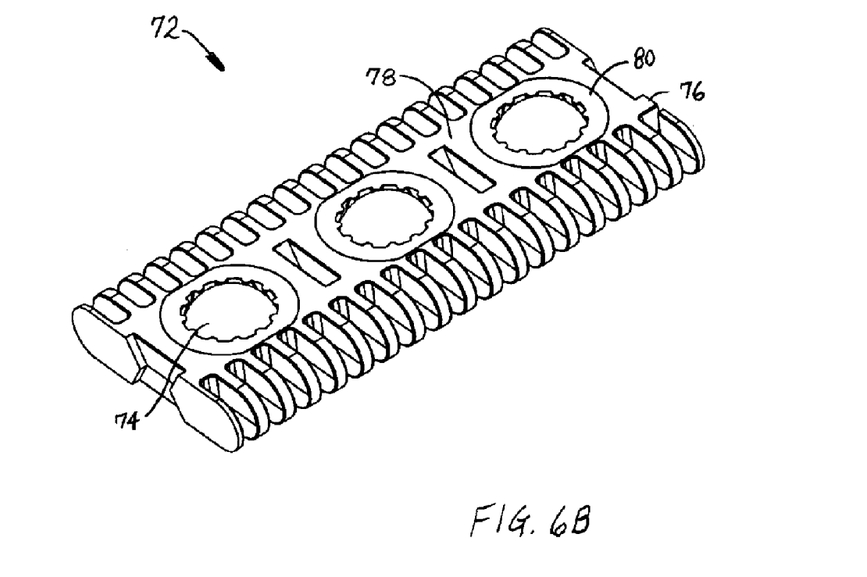
FIG. 6B is an isometric view of the module of FIG. 6A in an assembled state.

According to one such way, depicted in the spherical roller version of FIGS. 6A and 6B, the module 72 includes a module body 76, the spherical roller ball 74, and a retainer in the form of a ring 80. Internal wall structure in the module body defines a rounded cavity 82. The wall structure includes a first closed, rounded wall 84 whose outer edge 86 terminates at the first outer surface 78 of the module body. A second closed, rounded wall 85 has an outer edge 87 that meets the opposite second outer surface 79 of the module body. The diameter of the second wall is less than that of the first wall. A ledge 88, providing a seat for the retainer ring, is formed between the inner edges 86', 87' of the two walls. Ribs 90, arranged as lines of longitude on the second wall, support the roller ball in low-friction contact. Similar ribs 91 are formed on the inner surface of the retainer ring. The roller and the retainer ring are installed in the cavity. The retainer is then ultrasonically welded to the seat to retain the ball in place. Bonding with epoxy, bonding with solvents, electromagnetic welding, and spin welding are alternative methods of attachment of the retainer to the seat in the module body.

Figure 7:
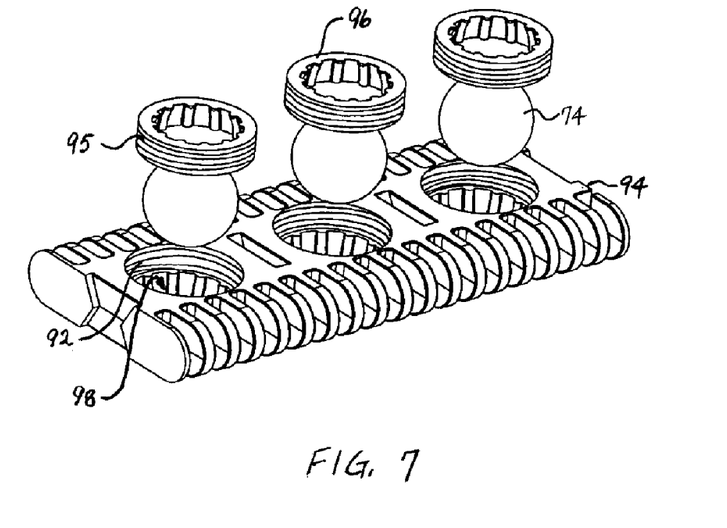
FIG. 7 is an exploded isometric view of the module of FIG. 5 with a screw-in roller retainer.
Figure 8:
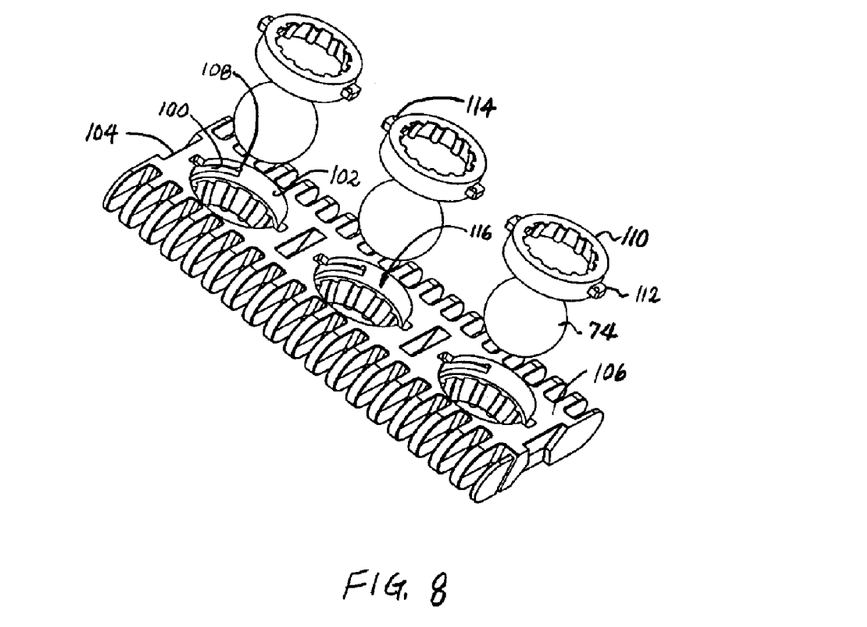
FIG. 8 is an exploded isometric view of the module of FIG. 5 with a snap-lock roller retainer.
Figure 9A:
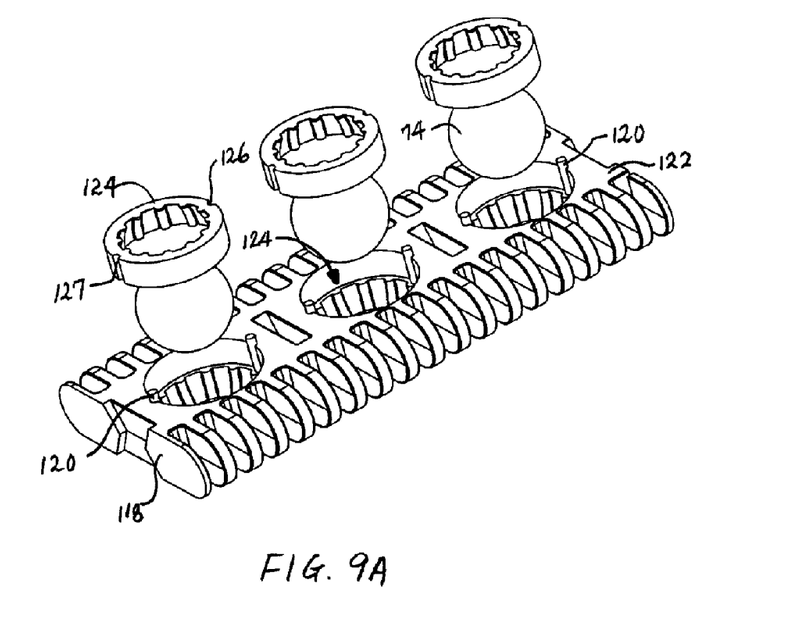
FIG. 9A is an exploded isometric view of the module of FIG. 5 with a staked roller retainer.
Figure 9B:
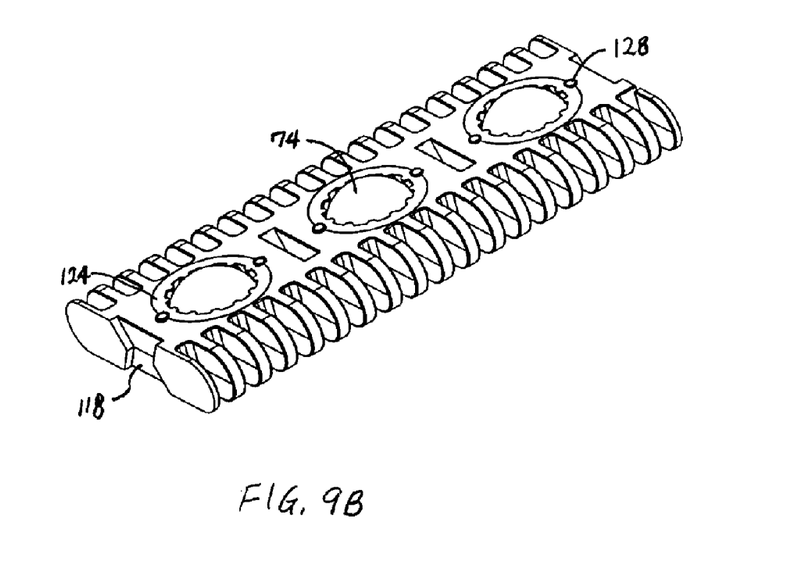
FIG. 9B is an isometric view of the module of FIG. 9A in an assembled state.

Other means of attachment are illustrated in FIGS. 7–9. In FIG. 7, for instance, the first closed wall 92 of the module body 94 forms threads that receive threads 95 on the periphery of a retainer ring 96. The roller ball 74 is dropped into the cavity 98 and the circular retainer ring screwed into place. As in the other retainer rings in FIG. 6, the diameter of the central opening in the rings 96 is less than the diameter of the roller ball. By covering a portion of the roller, the retainer keeps the ball in the module.

Another means of attachment is shown in FIG. 8, in which locking slots 100 are formed in the first closed wall 102 of the module body 104 at diametrically opposed positions.

The slots are L-shaped and open onto the outer surface 106 of the module body. A locking recess 108 is provided at the closed end of each slot. Retainer rings 110 include locking tabs 112 each with a bump 114 that is received in the locking recess at the ends of the slots. After a roller 74 is installed in the cavity 116, the tabs on the retainers are inserted in the L-shaped slots where they open onto the outer surface. Then the retainers are rotated clockwise until the bumps on the tabs lock in place in the locking recesses at the ends of the slots. In this way, as in the screw-in version, the rollers are retained in place in the cavities, but are removable by unscrewing the retainers.

Another example of a means for attachment is shown in FIGS. 9A and 9B. In this version, a module body 118 includes a pair of posts 120 extending beyond an outer surface 122 of the module body at diametrically opposite positions across a cavity 124. Retainer rings 126 for spherical rollers 74 include diametrically opposed grooves 127 on the periphery of the rings. When the roller and retainer are inserted in the cavity, the posts are received in the grooves registering the retainer in place. The top portions of the posts are then flattened or deformed by, for example, heat, pressure, impact, or ultrasonic energy, forming an enlarged button 128 that stakes the retainer in position over the roller.

Thus, the invention has been described with respect to a few exemplary versions, but other versions are possible. For example, unlike the rollers shown in the examples in the drawings, the spherical rollers do not have to extend beyond both outer belt surfaces, and the rollers with axles could extend beyond both sides. All that is necessary is that the geometry of the internal wall structure and the diameters of the rollers be appropriately changed. Several of the various means of attachment in the roller ball examples could be used for the cylindrical rollers as well. The retainers shown are ring-shaped with a central opening. But it would be possible to retain rollers with retainers that do not form closed rings. For example, plugs that can be inserted into the module body with each covering and end of a roller axle could be used as retainers. So, as these few examples suggest, the scope and spirit of the claims are not meant to be limited to the disclosed versions.

What is claimed is:

1. A plastic conveyor belt module comprising:
   a module body extending in thickness from a first side to a second side and forming a cavity opening onto at least one of the first and second sides;
   a spherical roller disposed in the cavity; and
   a retainer ring retained in the cavity and having a central opening with a diameter less than the diameter of the spherical roller to cover a portion of the spherical roller to retain the roller rotatably in the cavity with a salient portion of the roller extending outward of at least one of the first and second sides of the module body.

2. A plastic conveyor belt module as in claim 1 wherein the retainer ring further includes a top surface flush with the first side of the module body.

3. A plastic conveyor belt module as in claim 1 wherein the cavity includes slotted portions opening onto the first side of the module body, and wherein the retainer ring has locking tabs extending outward of the periphery of the ring and lockably received in the slotted portions.

4. A plastic conveyor belt module as in claim 1 wherein the module body further includes posts extending outward from at least one of the first and second sides of the module body and wherein the retainer ring includes receptacles for receiving the posts to maintain the retainer ring in a retaining position retaining the spherical roller in the cavity when the outer ends of the posts are flattened over the retainer ring.

5. A plastic conveyor belt module as in claim 1 wherein the cavity is a threaded cavity, and wherein the retainer ring has a peripheral thread received in the threaded cavity.

6. A plastic conveyor belt module as in claim 1 wherein the module body includes wall structure defining the cavity and including a seat disposed between the first and second sides of the module body and wherein the retainer ring sits on the seat in the cavity, and further comprising keying structure in the wall structure of the module body and on the retainer ring to key the position of the retainer ring in the cavity.

7. A plastic conveyor belt module as in claim 1 wherein the retainer ring is ultrasonically welded to the module body.

8. A plastic conveyor belt module as in claim 1 comprising a plurality of cavities formed in the module body and a spherical roller and a retainer ring received in each cavity.

9. A plastic conveyor belt comprising a plurality of plastic conveyor belt modules as in claim 1 interconnected in a conveyor belt.

10. A plastic conveyor belt module with an embedded roller, the module comprising:
    a module body extending in thickness from a first outer surface to a second outer surface and including interior wall structure defining a cavity in the module body, the wall structure including:
      a first closed wall extending from an inner edge to a outer edge terminating at the first outer surface of the module body, the first closed wall having a first diameter;
      a second closed wall coaxial with the first closed wall and extending from an inner edge to an outer edge terminating at the second outer surface and having a second diameter less than the first diameter of the first closed wall;
      a ledge between the inner edge of the first closed wall and the inner edge of the second closed wall;
    a spherical roller disposed in the cavity; and
    a retainer dimensioned to be received in the cavity and surrounded by the first closed wall and having a central opening with a diameter less than the diameter of the spherical roller to retain the roller rotatably in the cavity with a salient portion of the roller extending through the retainer outward of the first outer surface.

11. A plastic conveyor belt module as in claim 10 wherein the retainer covers a portion of the spherical roller in the cavity.

12. A plastic conveyor belt module as in claim 10 wherein the first closed wall is threaded, and wherein the retainer is a ring having a peripheral thread received in the cavity.

13. A plastic conveyor belt module as in claim 10 wherein the retainer further includes a top surface flush with the first outer surface of the module body.

14. A plastic conveyor belt module as in claim 10 wherein a salient portion of the spherical roller extends outward of the second outer surface of the module body.

15. A plastic conveyor belt module as in claim 10 wherein the retainer is ultrasonically welded to the ledge.

16. A plastic conveyor belt module as in claim 10 further comprising keying structure in the wall structure of the module body and on the retainer to key the position of the retainer in the cavity.

17. A plastic conveyor belt module as in claim 10 wherein the first closed wall forms slots along portions of the wall opening onto the first outer surface of the module body, and wherein the retainer is a ring having locking tabs extending outward of the periphery of the ring and lockably received in the slots.

18. A plastic conveyor belt module as in claim 10 wherein the module body further includes posts extending outward from at least one of the first and second outer surfaces of the module body and wherein the retainer includes receptacles for receiving the posts to maintain the retainer in a retaining position retaining the spherical roller in the cavity when the outer ends of the posts are flattened over the retainer.

19. A plastic conveyor belt module as in claim 10 comprising a plurality of cavities formed in the module body and a spherical roller and a retainer received in each cavity.

20. A plastic conveyor belt comprising a plurality of plastic conveyor belt modules as in claim 10 interconnected in a conveyor belt.

* * * * *